Jan. 16, 1962        G. S. ALLIN, SR        3,016,634
CRAWLER TRACTOR ATTACHMENTS
Filed Sept. 19, 1958        4 Sheets-Sheet 1
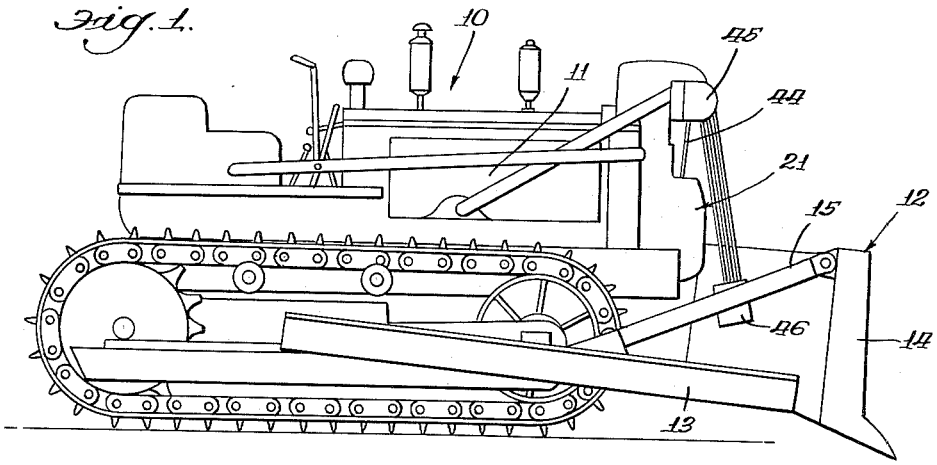
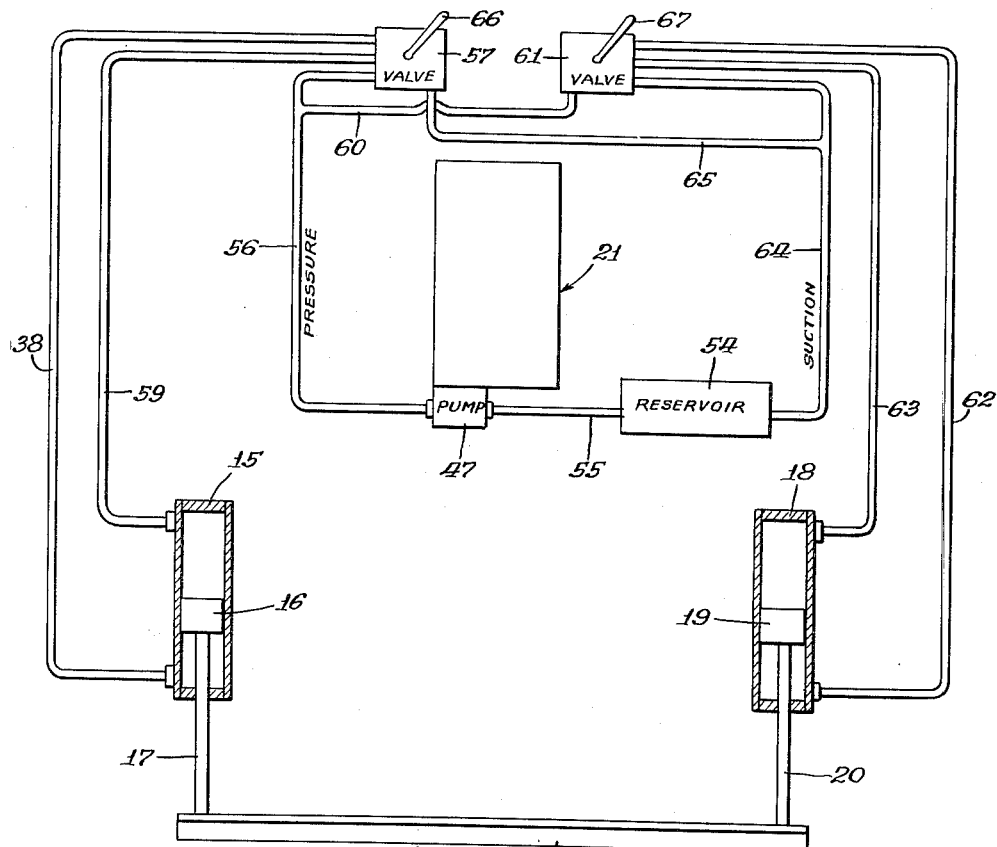

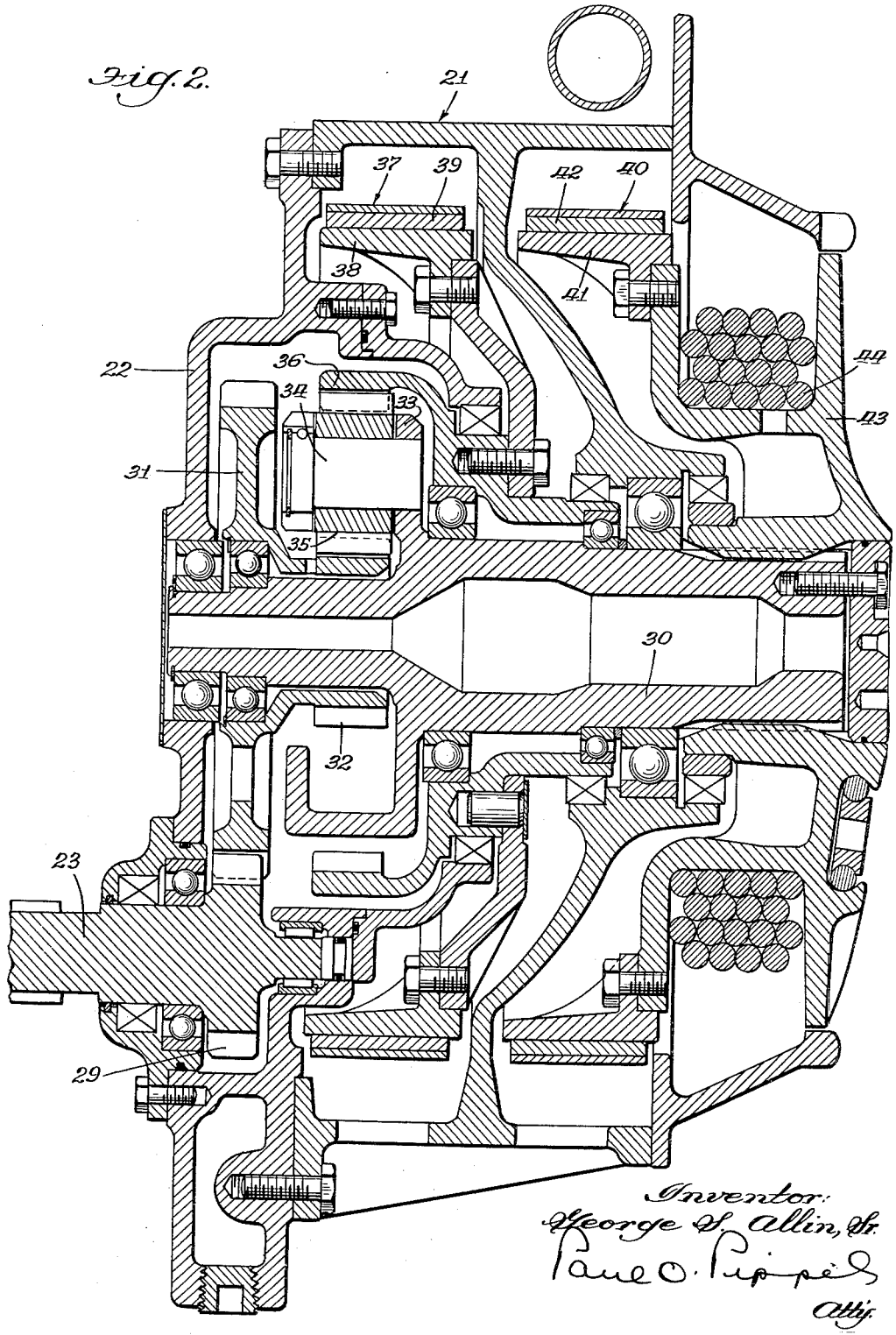

Jan. 16, 1962  G. S. ALLIN, SR  3,016,634
CRAWLER TRACTOR ATTACHMENTS
Filed Sept. 19, 1958  4 Sheets-Sheet 3
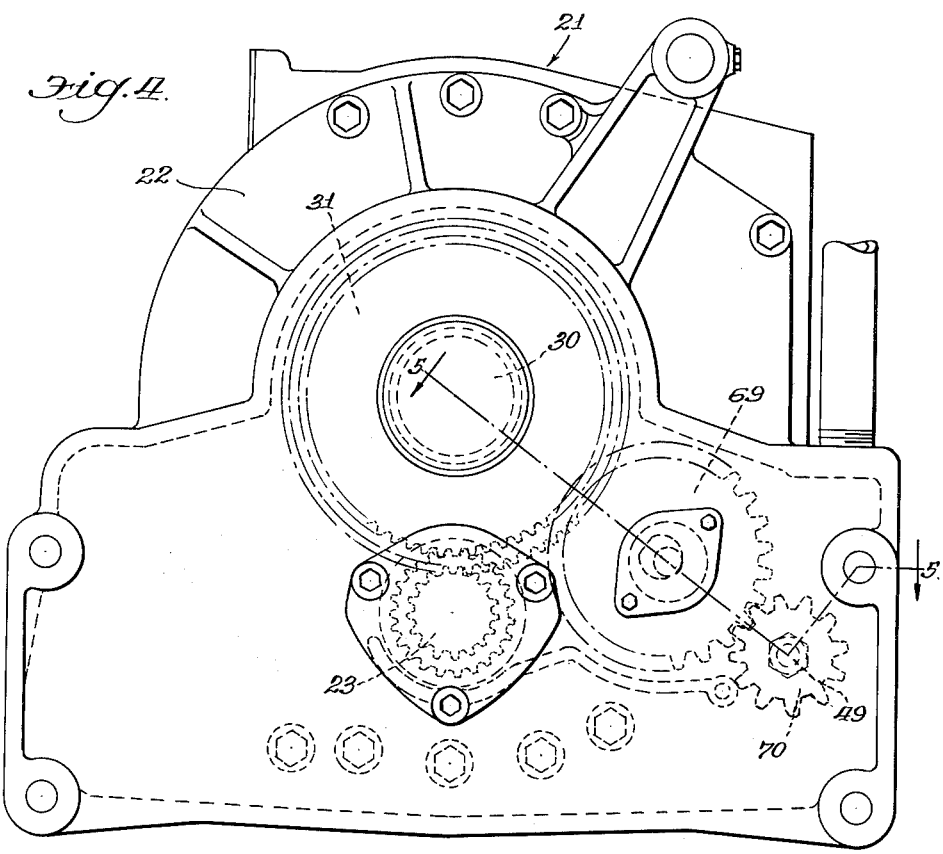
Fig. 4.
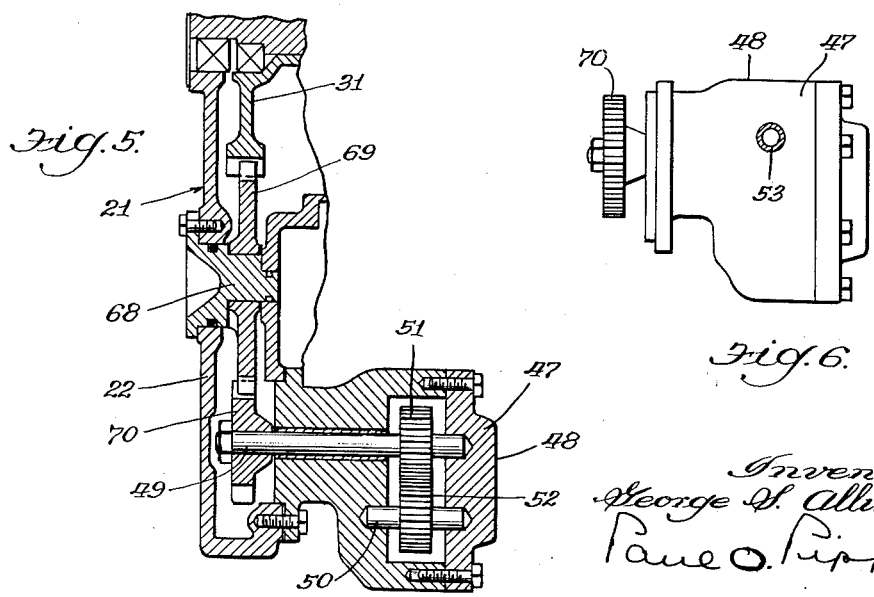
Fig. 5.
Fig. 6.
Inventor:
George S. Allin, Sr.
Paul O. Pippel
Atty.

United States Patent Office 3,016,634
Patented Jan. 16, 1962

3,016,634
CRAWLER TRACTOR ATTACHMENTS
George S. Allin, Sr., Flossmoor, Ill., assignor to International Harvester Company, Chicago, Ill., a corporation of New Jersey
Filed Sept. 19, 1958, Ser. No. 762,095
3 Claims. (Cl. 37—144)

This invention relates to crawler tractor attachments and is primarily concerned with a cable control unit and connected pump for operating a bulldozer on a crawler tractor.

The object of the invention is to provide a cable control unit for raising and lowering a bulldozer blade and a pump for changing the pitch and tilt of the bulldozer blade on the front end of a crawler tractor with the pump being driven from the cable control unit leaving the rear power take-off shaft available for other attachments.

The foregoing and other objects of the invention will be apparent from the construction and arrangement illustrated in the accompanying drawings wherein:

FIGURE 1 is a side elevational view of a crawler tractor with a bulldozer mounted thereon;

FIGURE 2 is a vertical sectional view through the cable control unit for raising and lowering the bulldozer blade;

FIGURE 3 is a schematic view of the hydraulic circuit for changing the pitch and tilt of the bulldozer blade;

FIGURE 4 is a rear elevational view of the cable control unit, and

FIGURE 5 is a fragmentary cross-sectional view taken on the line 5—5 of FIGURE 4;

FIGURE 6 is a side elevational view of the pump driven by the cable control unit.

Figure 7:
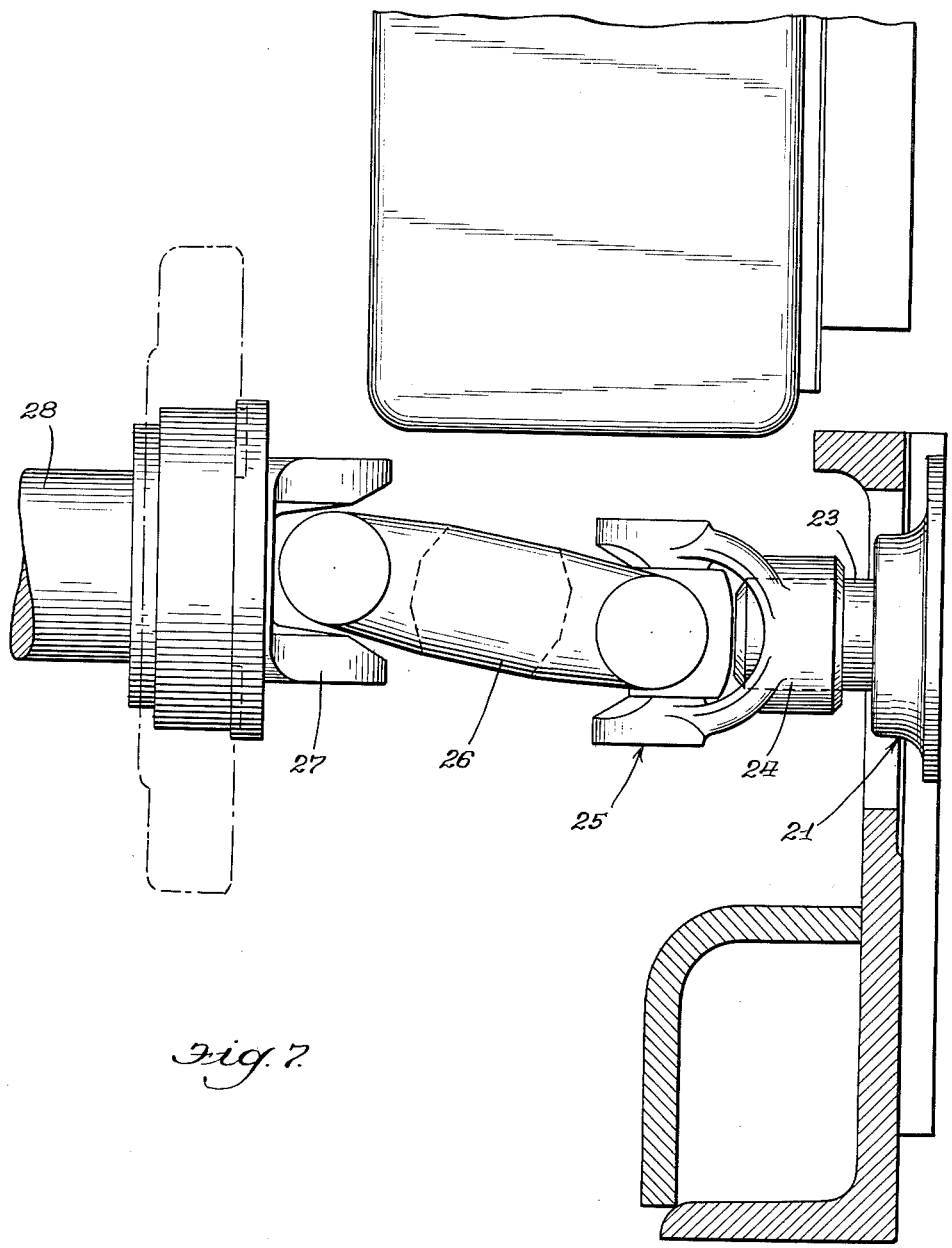
FIGURE 7 is a side elevational view showing the connection between the cable control unit shaft and the engine crankshaft.

There is one power take-off shaft on the front end of the tractor engine and one power take-off shaft situated at the rear of the tractor. When a cable control unit is mounted on the front of the tractor for raising and lowering the bulldozer blade and a logging winch or a unit of ripper teeth is mounted on the rear of the tractor there is now power take-off shaft available for a pump to change the pitch and tilt of the bulldozer blade. The invention proposes mounting the pump on the cable control unit on the front of the tractor and driving the pump from the cable control unit leaving the rear power take-off shaft available for operating a logging winch or a unit of ripper teeth and all equipment for raising and lowering the bulldozer blade and for changing the pitch and tilt of the bulldozer blade is mounted on the front end of the tractor eliminating hydraulic lines running to the rear end of the tractor or a cable running to the rear end of the tractor.

In the drawings, 10 generally designates a crawler tractor having an internal combustion engine 11 for propelling the tractor. A bulldozer 12 is comprised of side arms 13 each having one end pivoted to the track frame and a blade 14 universally jointed to the other ends of the side arms and a tilt and pitch cylinder 15 having one end pivoted to one side arm 13 and having a piston 16 therein and a piston rod 17 fixedly secured to the piston and universally connected to the blade 14. A pitch cylinder 18 has one end pivoted to the other side arm 13 and has a piston 19 therein and a piston rod 20 fixedly secured to the piston and universally connected to the blade 14.

A cable control unit 21 is mounted on the front of the crawler tractor 10 and has a housing 22 and a shaft 23 is rotatably mounted in the housing and is secured to a part 24 of a joint 25. A member 26 is pivotally mounted in joint 25 and is also pivotally mounted in a joint 26 including a part 27 which is fixedly secured to the engine crankshaft 28. The cable control unit 21 is comprised of a spur gear 29 integral with the shaft 23 and a shaft 30 rotatably mounted in the housing 22 and a spur gear 31 rotatably mounted on the shaft 30 and having a spur gear 32 integral therewith. A gear carrier 33 is integral with shaft 30 and three pins 34 are tightly fitted in holes in the gear carrier and spur gears 35 are rotatably mounted on the pins. A ring gear 36 is rotatably mounted on the shaft 30 and meshes with the spur gears 35. A brake 37 includes a brake drum 38 bolted to the ring gear 36 and a brake band 39. A brake 40 includes a brake drum 41 and a brake band 42. A cable drum 43 is splined on the shaft 30 and is bolted to the brake drum 41. A cable 44 is wound on the cable drum 43 and is trained around sheaves 45 on the tractor and sheaves 46 on the bulldozer blade. A handle located at the operator's seat is operatively connected to the brake band 39. When it is desired to raise the bulldozer blade 14 the brake 37 is engaged and the brake 40 is released and cable drum 43 winds the cable 44 thereon. When the bulldozer blade 14 is raised to the location desired the brake 37 is released and the brake 40 is engaged. When it is desired to lower the bulldozer blade 14 the brake 40 is gradually released.

A pump 47 is carried by the cable control unit 21 and is comprised of a housing 48 and a shaft 49 projecting from the housing and rotatably mounted in the housing and a shaft 50 rotatably mounted in the housing and a gear 51 fixedly secured on the shaft 49 and a gear 52 fixedly secured on the shaft 50 and meshing with the gear 51. The pump housing 48 has a fluid inlet 53 therein and a fluid outlet in the opposite side of the housing. A fluid reservoir 54 is in communication with the pump 47 through a conduit 55 and a conduit 56 is in communication with the pump and a valve 57 for the tilt cylinder 15. A conduit 58 is in communication with the tilt and pitch cylinder 15 on one side of the piston 16 and the valve 57 and a conduit 59 is in communication with the tilt and pitch cylinder on the other side of the piston and the valve. A conduit 60 is in communication with the conduit 56 and a valve 61 for the pitch cylinders 15 and 18. A conduit 62 is in communication with the valve 61 and the pitch cylinder 18 on one side of the piston 19 and a conduit 63 is in communication with the valve and the pitch cylinder on the other side of the piston. A conduit 64 is in communication with the fluid reservoir 54 and the valve 61 and a conduit 65 is in communication with the valve 57 and the conduit 64. The valves 57 and 61 are located at the operator's seat and have levers 66 and 67 respectively for operating them. A shaft 68 is fixedly secured in the cable control unit housing 22 and a spur gear 69 is rotatably mounted on the shaft and meshes with the spur gear 31 and a spur gear 70 is fixedly secured on the shaft 49 and meshes with the spur gear 69. Movement of lever 66 in one direction causes fluid to be admitted to the tilt cylinder 15 on one side of the piston 16 and fluid on the other side of the piston is moved out the tilt cylinder into conduits 65 and 64 to the fluid reservoir 54 to change the tilt of the bulldozer blade 14 in one direction and movement of the lever in the opposite direction causes the piston to be moved in the opposite direction in the tilt cylinder to change the tilt of the bulldozer blade in the opposite direction. Movement of lever 67 in one direction causes fluid to be admitted to adjacent chambers of the pitch cylinders 15 and 18 on one side of the pistons 16 and 19 respectively and fluid is moved out of the other chambers of the pitch cylinders into the fluid reservoir 54 to change the pitch of the bulldozer blade in one direction and movement of the lever in the opposite direction causes the pistons to be moved in the pitch cylinders in the opposite direction to change the pitch of the bulldozer blade in the opposite direction.

What is claimed is:

1. Transmission means for manipulating an implement on the front end of a tractor having an engine including a crankshaft, said transmission means comprising a cable unit mounted on the front end of the tractor and operatively connected with the implement for raising, holding and lowering the implement, rotatably mounted shaft means operatively connected with the crankshaft and carrying a first gear means constrained for rotation with the shaft means, second gear means meshing with the first gear means, and speed reduction drive transmitting means operatively connecting the second gear means with the cable unit, fluid operated means connected with the implement for selectively changing the pitch and tilt thereof and including a pump having a gear element meshing with the second gear means providing continuous engine driven pump operation, said transmission means being provided with operator controlled brake means including a first brake unit selectively engaged with the speed reduction drive transmitting means providing reduced drive connection between the second gear means and the cable unit to raise the implement and a second brake unit selectively engaged with the cable unit to hold the implement, said implement being lowered when both brake units are disengaged.

2. Transmission means for manipulating an implement on the front end of a tractor having an engine including a crankshaft, said transmission means comprising a cable unit mounted on the front end of the tractor and operatively connected with the implement for raising, holding and lowering the implement, rotatably mounted shaft means operatively connected with the crankshaft and carrying a first gear means constrained for rotation with the shaft means, second gear means meshing with the first gear means and speed reduction drive transmitting means operatively connecting the second gear means and the cable unit, fluid operated means connected with the implement for selectively changing the pitch and tilt thereof and including a pump having a gear element meshing with the second gear means providing continuous engine driven pump operation, said transmission means being provided with operator controlled mechanism including a first means selectively connected with the speed reduction drive transmitting means providing reduced drive connection between the second gear means and the cable unit to raise the implement and a second means selectively connected with the cable unit to hold the implement, said implement being lowered when both means of the operator controlled mechanism are disconnected.

3. Transmission means for manipulating an implement on the front end of a tractor having an engine including a crankshaft, said transmission means comprising a cable unit mounted on the front end of the tractor and operatively connected with the implement for raising and holding the implement, rotatably mounted shaft means operatively connected with the crankshaft and carrying a first gear means constrained for rotation with the shaft means, second gear means meshing with the first gear means and speed reduction drive transmitting means operatively connecting the second gear means and the cable unit, fluid operated means connected with the implement for selectively changing the pitch and tilt thereof and including a pump having a gear element meshing with the second gear means providing continuous engine driven pump operation, said transmission means being provided with operator controlled mechanism including a first means selectively connected with the speed reduction drive transmitting means providing reduced drive connection between the second gear means and the cable unit to raise the implement and a second means selectively connected with the cable unit to hold the implement.

References Cited in the file of this patent

UNITED STATES PATENTS

| | | |
|---|---|---|
| 2,365,677 | Burns | Dec. 26, 1944 |
| 2,375,233 | Magee | May 8, 1945 |
| 2,537,267 | Gurries | Jan. 9, 1951 |
| 2,674,817 | Palmiter | Apr. 13, 1954 |
| 2,787,065 | Bock et al. | Apr. 2, 1957 |